United States Patent
Lalleman et al.

(10) Patent No.: US 9,110,172 B2
(45) Date of Patent: Aug. 18, 2015

(54) PORTABLE AND VERSATILE X-RAY OR GAMMA IMAGING DEVICE FOR NON-DESTRUCTIVE EXAMINATION OF SUSPICIOUS PACKAGES, INTEGRATING TRANSMISSION AND BACKSCATTERING IMAGING TECHNIQUES

(71) Applicant: COMMISSARIAT A L'ENERGIE ATOMIQUE ET AUX ENERGIES ALTERNATIVES, Paris (FR)

(72) Inventors: Anne-sophie Lalleman, Chevreuse (FR); Gilles Ferrand, Brunoy (FR)

(73) Assignee: Commissariat A l'Energie Atomique et aux 'energies alternatives, Paris (FR)

( * ) Notice: Subject to any disclaimer, the term of this patent is extended or adjusted under 35 U.S.C. 154(b) by 148 days.

(21) Appl. No.: 13/649,023

(22) Filed: Oct. 10, 2012

(65) Prior Publication Data
US 2013/0094627 A1    Apr. 18, 2013

(30) Foreign Application Priority Data

Oct. 14, 2011   (FR) ...................... 11 59325

(51) Int. Cl.
| | |
|---|---|
| *G01N 23/203* | (2006.01) |
| *G01T 1/167* | (2006.01) |
| *G01V 5/00* | (2006.01) |
| *G01T 1/29* | (2006.01) |

(52) U.S. Cl.
CPC ............. *G01T 1/167* (2013.01); *G01T 1/295* (2013.01); *G01V 5/0016* (2013.01); *G01V 5/0025* (2013.01)

(58) Field of Classification Search
USPC ........................................... 378/87
See application file for complete search history.

(56) References Cited

U.S. PATENT DOCUMENTS

| | | | | |
|---|---|---|---|---|
| 3,539,808 | A * | 11/1970 | Hahn | 250/308 |
| 5,099,128 | A * | 3/1992 | Stettner | 250/370.11 |
| 5,339,349 | A * | 8/1994 | Xeno | 378/101 |
| 5,379,336 | A * | 1/1995 | Kramer et al. | 378/98.8 |
| 5,847,388 | A * | 12/1998 | Foote et al. | 250/310 |
| 6,737,652 | B2 * | 5/2004 | Lanza et al. | 250/363.06 |
| 7,623,614 | B2 | 11/2009 | Shefsky | |

(Continued)

FOREIGN PATENT DOCUMENTS

WO    0213517 A1    2/2002

OTHER PUBLICATIONS

Search Report in French Application No. FR1159325, dated May 9, 2012.

(Continued)

*Primary Examiner* — Phillip A Johnston
(74) *Attorney, Agent, or Firm* — Nixon Peabody LLP

(57) ABSTRACT

Portable and versatile X-ray or gamma imaging device for non-destructive examination of suspicious packages, integrating transmission and backscattering imaging.
It comprises an X or gamma radiation source (4) adapted to radiography, a large and finely pixelated detector (6) sensitive to X rays or gamma rays adapted to radiography, a removable shielding and collimation accessory (5) to adapt the source to backscattering imaging, a removable accessory (10) comprising a large and finely pixelated coded mask placed in contact with the detector when a backscattering imaging or radioactive source imaging is made, and a synchronized control system (14) for the source, the detector and the latter accessory, and for data acquisition and processing to display an image in real time.

8 Claims, 7 Drawing Sheets

(56) References Cited

U.S. PATENT DOCUMENTS

2004/0218714 A1 11/2004 Faust
2008/0095298 A1* 4/2008 Shefsky ............................ 378/2

OTHER PUBLICATIONS

Accorsi et al, "Near-field artifact reduction in planar coded aperture imaging", Applied Optics, Sep. 10, 2001, pp. 4697-4705, vol. 40, No. 26.

Carrel et al, "Gampex: a New Gamma Imaging System for Radiological Safety and Homeland Security Purposes", Nuclear Science Sumposium and Medical Imaging Conference, 2011 IEEE, Oct. 23, 2011, pp. 4739-4744.

Gottesman et al, "New family of binary arrays for coded aperture imaging", Applied Optics, Oct. 15, 1989, pp. 4344-4352, vol. 28, No. 20.

Lalleman et al, "A Dual X-ray Backscatter System for Detecting Explosives: Image and Discrimination of a Suspicious Content", Nuclear Science Symposium and Medical Imaging Conference, 2011 IEEE, Oct. 23, 2011, pp. 299-304.

* cited by examiner

PORTABLE AND VERSATILE X-RAY OR GAMMA IMAGING DEVICE FOR NON-DESTRUCTIVE EXAMINATION OF SUSPICIOUS PACKAGES, INTEGRATING TRANSMISSION AND BACKSCATTERING IMAGING TECHNIQUES

CROSS REFERENCE TO RELATED APPLICATIONS OR PRIORITY CLAIM

This application claims benefit of French Patent Application No. 11 59325, filed Oct. 14, 2011, the contents of which are incorporated herein by reference in their entirety.

TECHNICAL FIELD

This invention relates to a portable device for non-destructive examination of packages suspected of containing illegal or dangerous materials (particularly explosives).

This device can be easily and quickly used to make X-rays or backscattering images that have the property of revealing lightweight materials. It can also be used for X-ray or gamma imaging of radioactive sources contained in a package.

The invention is used in applications particularly in the field of safety or mine removal departments of the army and the police that are responsible for the investigation of objects suspected of being Improvised Explosive Devices or Improvised Radiological Devices. The search for illegal materials (drugs, etc.) made by customs officers is also another possible application. Finally, due to the similarity of the techniques used, the invention can be used in applications in the industrial field for non-destructive testing of individual or assembled mechanical parts.

STATE OF PRIOR ART

In the field of anti-terrorist policy, the control of objects and merchandise faces two distinct problems:
  systematic analysis of the content of packages in a flow like that encountered in port or airport freight zones,
  the specific and occasional analysis of isolated packages.

In the first case, by default objects are assumed to be inoffensive. They are usually analysed by transmission X-ray imaging, by scanning the object. The backscattering technique can also provide useful information. Systems used for large flows are fixed and enable the analysis of objects with a size varying from a small baggage to a vehicle, imposing relative movement between the imaging system and the object.

In the second case, by default objects are assumed to be dangerous. The object is then ideally analysed using portable equipment as quickly as possible, without moving the object and without coming into contact with it. The scanning technique is inoperative in this case; and speed requirements for use of the equipment and obtaining a reliable diagnostic make it difficult to develop an imaging system satisfying the needs and particular constraints of this case.

Portable devices exist for non-destructive examination of objects by X-radiography (in transmission). They comprise detectors with large finely pixelated areas, offering good spatial resolution and a wide field of view adapted to the size of small baggage or backpacks. The X-radiation source and the detector included in such devices must be placed on each side of a package to be able to examine it.

With such devices, it is impossible to analyse an object placed too close to a surface if the space between this surface and the object is insufficient to install the detector.

Another portable device is also known for non-destructive examination of objects. It uses X backscattering imaging. It is disclosed in the following document, which should be referred to:

[1] US 2004/0218714, invention by A. A. Faust.

This other device is used to detect and identify antipersonnel mines or Improvised Explosive Devices by a spectro-imager.

It comprises a radiation source to irradiate a zone to be examined, a coded mask and a CdTe matrix detector that receives radiation backscattered by the zone concerned through the coded mask, for which the spectral energy is always less than that of the incident radiation energy. The result is obtained after mathematical processing to decode the raw image using the CAI (Coded Aperture Imaging) technique.

For technological and economic reasons, the CdTe detector comprises a small detection matrix and there is only a small number of detection pixels in it. The same is true for the associated coded mask; it is small and there are few pixels in it.

Consequently, the spatial resolution of this other known device is too low and its field of view is not wide enough for it to be used in transmission and in backscattering in the fields mentioned above. In particular, it cannot be used to examine suspicious packages with the required performance level.

Therefore, there is a need for the development of a portable system capable of performing the two imaging functions (transmission imaging and backscattering imaging) in order to deal with a wide range of situations encountered.

PRESENTATION OF THE INVENTION

This invention solves the problem of the design of a portable and versatile device capable of making a non-destructive examination of an object either by X-radiography or by X backscattering imaging, with a good compromise between the spatial resolution, the field of view and the detection sensitivity.

The analysed objects are usually about the size of a backpack or a small baggage.

This device (imager) is also capable of locating a radioactive material in a field of view, without irradiation.

Five distinct innovative pieces of equipment are combined to solve the problem mentioned above:
  an X or gamma radiation source adapted to radiography,
  at least one matrix detector sensitive to X rays or gamma rays, that is large and finely pixelated, adapted to radiography, this detector having a large useful detection zone in which a square with sides of at least 20 cm will be inscribed, this useful zone being composed of small detection pixels, smaller than 300 µm,
  a removable shielding and collimation accessory fitted on the X or gamma radiation source, to adapt it to backscattering imaging,
  at least one removable image formation accessory based on the coded aperture imaging technique, this image formation accessory including a mechanical structure, preferably motor driven, comprising a large and finely pixelated coded mask (plate with multiple holes, preferably metallic), on which a square with sides of at least 6 cm can be inscribed, this coded mask comprising small pixels smaller than 1000 µm, the structure being designed to be placed in contact with the detector for backscattering imaging or radioactive source imaging, and a system for the synchronised control of the X or gamma radiation source, the detector and the image formation accessory, and for data acquisition and processing in order to display an image in real time.

The invention is based on the innovative association of the two removable accessories mentioned above with an X radiography system, so that the following three inspection techniques can be used:

single-energy or multi-energy radiography,
backscattering imaging, and
radiation source imaging.

The invention also includes the design and development of the two accessories mentioned above.

The complete device according to the invention is composed of a set of portable equipment that may be made energy independent, operating on batteries if necessary and that can be remote controlled. Due to its good spatial resolution and a wide field of view in all measurement configurations, its versatility enables the user to adapt to a wide range of situations encountered, for example:

fast and easy examination of an object abandoned in the middle or in the corner of a room and which is therefore difficult to access, without touching it or moving it,
or detection of the radioactive nature of an object, using an image.

According to one particular embodiment of the portable device according to the invention, the radiation source is an X-ray generator with a power of more than 100 W.

The mechanical structure comprising the coded mask is preferably equipped with shielding that will protect the detector from parasite radiation.

Preferably, the coded mask has an anti-symmetric MURA type pattern and the portable device also comprises a rotation device to reversibly rotate the coded mask from 0° to 90°.

The matrix detector which is sensitive to X or gamma rays may include a pixelated electronic detector or a radioluminescent screen with memory.

This invention also relates to a method for using the portable device according to the invention in which:

the radiation source and the detector are placed on each side of the object so that it can be examined by X or gamma radiography, or
the radiation source fitted with the shielding and collimation accessory and the detector fitted with the image formation accessory are placed on the same side of the object so that it can be examined by X or gamma backscattering imaging, or
the detector fitted with the image formation accessory is placed facing the object to examine it to determine whether or not it contains a radioactive source.

This invention also relates to another method of using the portable device according to the invention, in which:

the portable device comprises two detectors,
the radiation source fitted with the shielding and collimation accessory, and one of the detectors, are placed on each side of the object so that it can be examined by X or gamma radiography, and
the other detector fitted with the image formation accessory, and the source are placed on the same side of the object so that it can then be examined by X or gamma backscattering imaging.

This invention also relates to a method for using the portable device according to the invention in which:

the portable device comprises two detectors fitted with their image formation accessories,
the radiation source fitted with the shielding and collimation accessory and the two detectors are placed on the same side of the object to simultaneously examine the object by X or gamma backscattering along two different axes.

BRIEF DESCRIPTION OF THE DRAWINGS

This invention will be better understood after reading the description of example embodiments given below for information only and in no way limitative, with reference to the appended drawings in which.

DETAILED PRESENTATION OF PARTICULAR EMBODIMENTS

The following describes methods of using one example of the portable device according to the invention.

Figure 1:
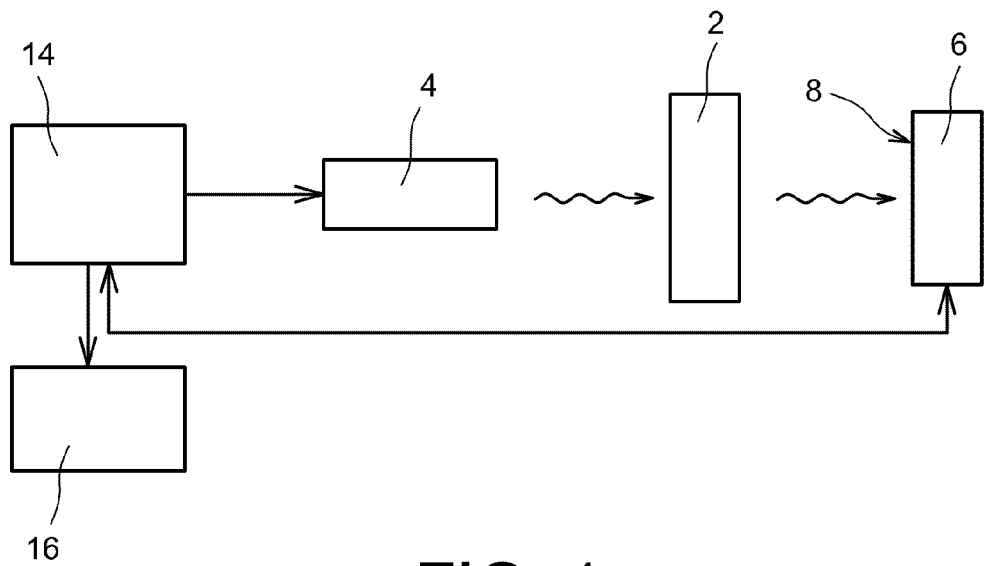
FIG. 1 diagrammatically shows an implementation of the equipment in an example of the device according to the invention, used for examining an object by X radiography, FIG. 2 diagrammatically shows another implementation of the equipment in the example of the device, used for examining an object by X radiation backscattering imaging.

In this example, the device is based on an X radiography equipment comprising a continuous X generator 4 associated with a pixelated detector 6 (matrix detector sensitive to the position of incident photons) for making images of objects the size of a baggage, according to the diagrammatic view shown in FIG. 1.

The reference 8 shows the useful detection zone of the detector 6.

In this case, the generator 4 (X-radiation source) and the detector 6 are placed on each side of an object 2 in a geometric configuration considered by the operator to be optimum, taking account of the required image quality and possible constraints related to the environment. The spectral distribution of the X-radiation and the spatial divergence of the X-ray beam illuminating the object 2 and the detector 6 must be adapted to the measurement.

The assembly is controlled by integrated hardware and software equipment 14 that enables two possible measurement configurations:
- the first consists of making a conventional single energy image for which the operator himself adjusts the voltage, the intensity and emission duration of the generator 4,
- the second, a dual energy configuration, is automatically controlled by the system that creates an image by combining two emission energies of the generator 4 so as to coarsely discriminate the organic or inorganic nature of elements contained in the object 2.

The equipment 14 is provided with a device 16 for displaying the images obtained.

Figure 2:
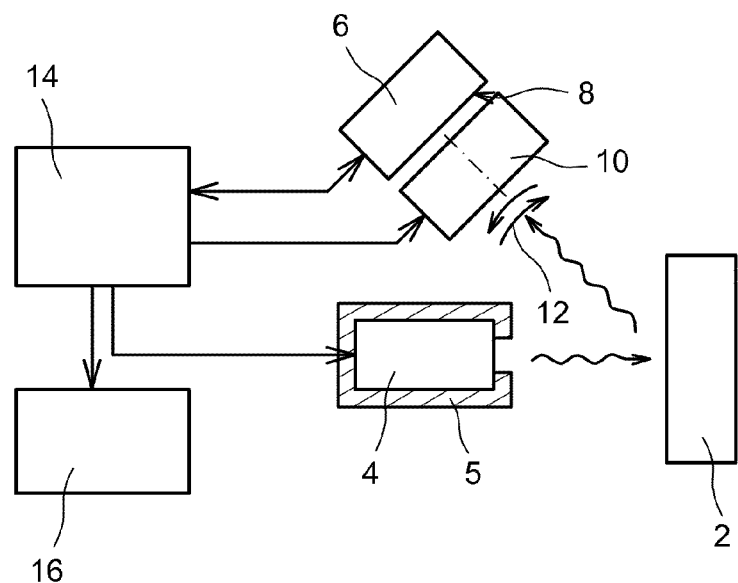

A portable accessory 10 is fitted to the equipment described above, that enables the formation of images of the X-radiation backscattered by the object, according to the measurement configuration diagrammatically shown in FIG. 2.

This accessory 10 comprises a multiple hole rotating metallic plate called a "coded mask", fixed to the detector 6 through a mechanical part (not shown) that acts firstly as a support and secondly protects the detector from parasite ambient radiation. When the accessory 10 is used, it is placed in contact with the useful detection zone 8; and it will form an image on this zone starting from incident X radiation originating from the object 2, for example baggage.

Note that the backscattering imaging technique can show up lightweight materials, such as materials from which explosives are made.

In the configuration in FIG. 2, the X radiation generator 4 and the detector 6 fitted with the accessory 10 (image formation device) are placed on the same side of the object 2 so that the object can be examined by X backscattering imaging.

The device can show what is contained in the baggage (for example a suitcase or a backpack).

The generator 4 is used as a primary X radiation source. It is fitted with a shielding and collimation accessory 5. This accessory or equipment 5 is designed to limit the X emission cone to the strict minimum, namely the useful area of the inspected object, and to block leakage radiation from the generator.

Without this accessory 5, the proportion of parasite radiation reaching the detector 6 (scattering in air or in zones in the object outside the imager's field of view) is too high considering the useful signal and seriously reduces the image quality.

Finally, the intensity of the X radiation source, its spectral distribution, the spatial divergence of the beam and the sensitivity of the detector must be adapted to the measurement.

The generator 4, the shielding and collimation accessory 5 and the image formation accessory 10 may be fixed to facilitate operational implementation of the device.

In FIG. 2, the double arrow 12 shows a reversible rotation of the coded mask which will be described later.

Figure 3:
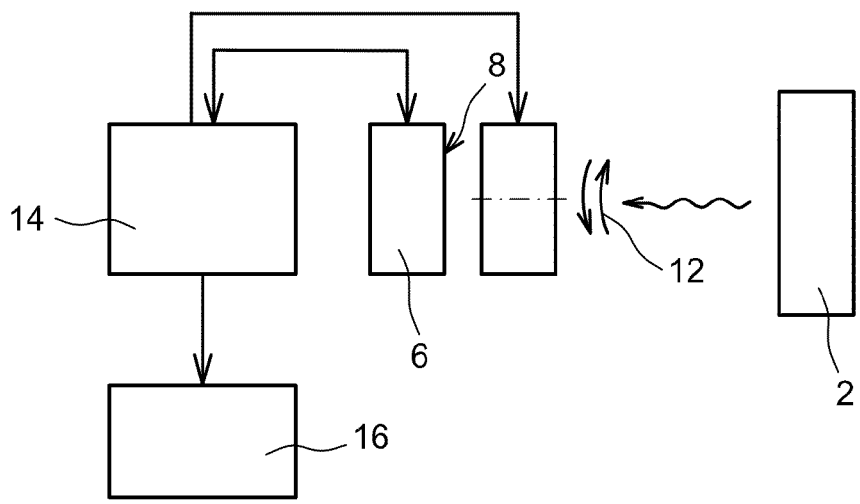
FIG. 3 is a diagrammatic view of the example of the device according to the invention in which it is used to detect the potential presence of a radioactive material in an object, and to locate it, FIG. 4 diagrammatically shows the implementation of a detector in the radiography position and another detector associated with an image formation device that can used in the invention, in a backscattering image configuration, FIG. 5 diagrammatically shows the implementation of two detectors each associated with corresponding image formation devices that can be used in the invention, in a backscattering image configuration for a three-dimensional reconstruction of elements forming the inspected object.

In the case of an object that itself emits X or gamma radiation (for example when a radioactive source is placed in a package), the detector 6 fitted with the image formation device 10 is placed facing the object 2 to locate the emission source in the field of view according to the scheme shown in FIG. 3. The generator 4 is then not used.

A radioactive source can be detected provided that the following parameters are appropriate: activity, emission energy, dimensions of the radioactive source, distance between the radioactive source and the coded mask, and the detector sensitivity. Imaging performances (field of view, spatial resolution) are identical to the performances of backscattered imaging, for the same measurement geometry.

Note that providing more imagers can enrich information obtained during examination of an object.

Figure 4:
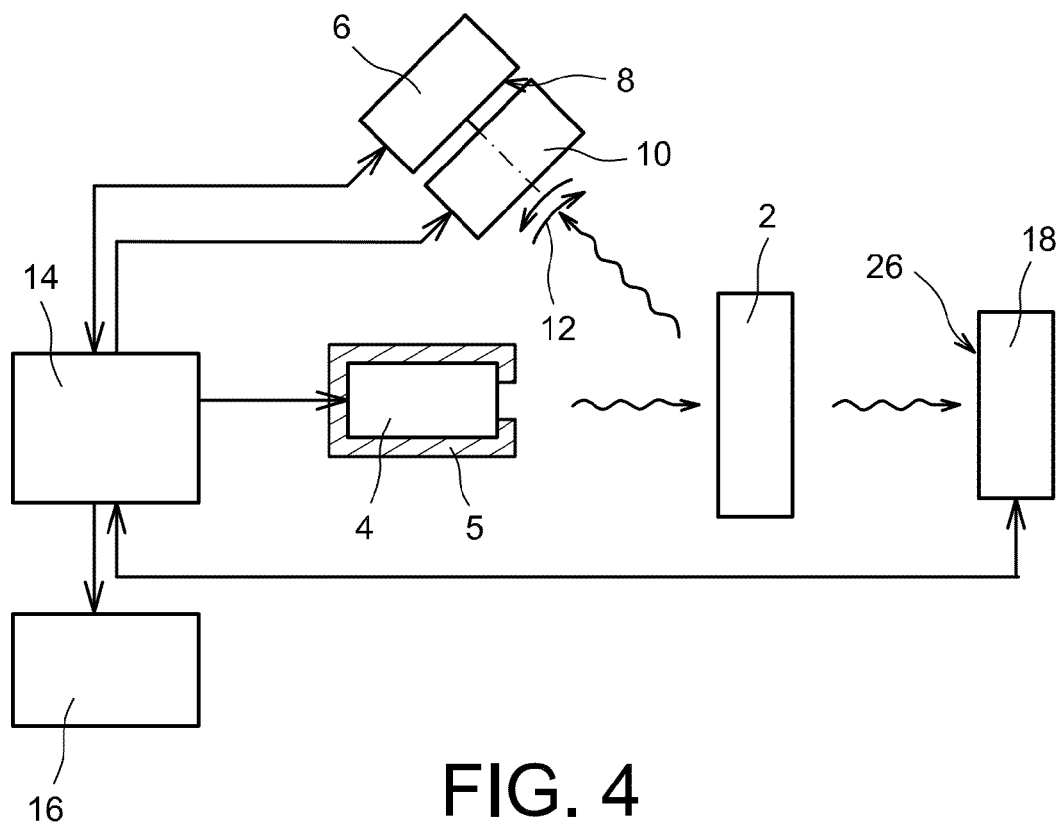

One possible measurement configuration is shown diagrammatically in FIG. 4.

A single radiation source 4 is necessary, with which its shielding and collimation accessory 5 is associated. Successive images in classical transmission and backscattering can be made without any action by the operator other than initial placement of the equipment, provided that all the instruments are controlled remotely.

In FIG. 4, the detector 6 with its accessory 10 can be used for acquisition of a backscattering image. The reference 18 represents the detector that makes it possible to form a transmission image; and reference 26 represents the useful detection zone of the detector 18. The production of successive images requires an adaptation of the settings of the generator 4 and detectors 6 and 18 used to move from one image to the next.

Figure 5:
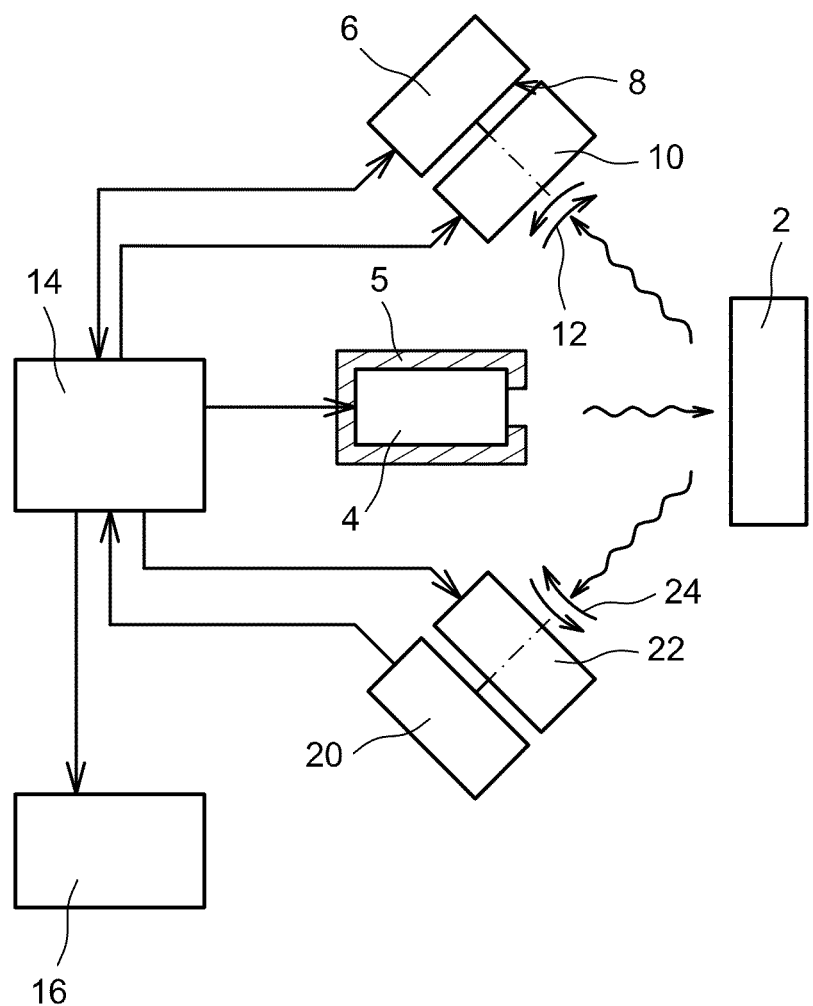

Another possible measurement configuration is diagrammatically shown in FIG. 5.

A single radiation source 4 is necessary, with which its shielding and collimation accessory 5 is associated. Simultaneous backscattering images can be made without any action by the operator other than the initial placement of the equipment, provided that all the instruments are remote controlled synchronously.

Two different lines of sight can make a tomographic reconstruction of particular elements of the object 2 possible. An increase in the number of lines can improve the result of the analysis.

In the example shown in FIG. 5, the detector 6 fitted with its accessory 10 makes it possible to obtain a backscattering image along a first line of sight; and another detector 20 identical to the detector 6 is used to obtain a backscattering image along a second line of sight. The detector 20 is associated with an image formation accessory 22 identical to the accessory 10. The double arrow 24 symbolises a reversible rotation of the coded mask of the accessory 22.

A combination of configurations like that shown in FIGS. 4 and 5 can be envisaged to non-simultaneously associate an image in transmission with synchronous backscattering images.

The same measurement configuration as shown in FIG. 5 but without an X radiation generator, is adapted to localizing and measuring the dimensions of one or several radioactive sources in the fields of views of imagers (detectors 6 and 20 fitted with their corresponding accessories 10 and 22).

We will now describe the equipment and firstly the X radiation source.

To be compatible with the two radiography techniques described above (transmission and backscattering), the radiation source 4 is a continuous X generator operating on batteries, with an energy endurance of about 10 minutes. The high voltage of this source 4 is between 80 kV and 200 kV, its power is greater than or equal to 100 Watts and its emission duration is at least a few minutes.

In fact, the complete device is compatible with various commercially available X radiation generators.

For information purposes only and without being in any way limitative, the source 4 is a portable X radiation generator marketed by the ICM Company under the name CP120 (adjustable voltage:80 to 120 kV, intensity:1 mA maximum at 120 kV and 1.5 mA at 80 kV, resulting in a power of 120 W).

Note that in the invention, the X radiation source may be replaced by a radioactive isotope for which the energy of the gamma emission lines and the dose rate are adapted to the measurement to be made.

Figure 6:
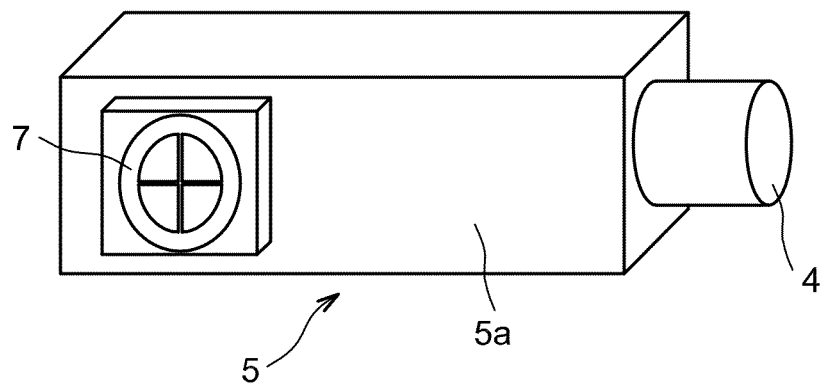
FIG. 6 is a diagrammatic view of an example shielding and collimation accessory that can be used in the invention.

We will now describe the removable shielding and collimation accessory 5 of the X radiation source 4 (that can also be used with a gamma radiation source), with reference to FIG. 6.

The source 4 is provided with this removable shielding and collimation accessory 5 so that it can be used for X radiation backscattering imaging.

The accessory 5 comprises shielding 5a that attenuates leakage radiation from the source 4, forming parasite radiation for the detector 6 in FIG. 2 considering the weak useful signal originating from radiation backscattered by the object 2. The shielding 5a is composed of a material with an atomic number and thickness such that the attenuation of the parasite radiation is sufficient, typically of the order of 1:1000, compatible with the characteristics of the X generator used.

The collimation is done using a ring 7, installed mechanically and removably on the shielding 5a and centred on the emission lobe of the source 4. This collimation is used mainly to delimit an illumination cone adapted to the size of the inspected object 2 and that if possible is less than or equal to the field of view of the detector 6. It also makes it possible to reduce the proportion of radiation diffused in air or in other irrelevant surrounding materials (walls, etc.) that disturb the measurements.

In the same way as above, the ring 7 is made from a material with an atomic number and thickness such that the radiation attenuation is sufficient. Several aperture diameters are potentially necessary to adapt to the different measurement configurations encountered (object size and distance to the object).

The design of the shielding and collimation device 5 is preferably optimised to minimise its weight.

For information only and in no way limitatively, the shielding 5a (not optimised) is a 5 mm thick lead casing of the generator 4. And 4 mm thick tungsten rings 7 (collimators) are used with diameters of between 10 mm and 50 mm, resulting in emission cones of between 10° and 30° respectively.

We will now describe the detector 6.

This detector 6 is adapted to measurements using the two techniques (X radiography and X backscattering). To achieve this, it is constituted by a matrix sensitive to X radiation in the 20 keV to 200 keV range. This matrix has a large active surface (at least 20 cm×20 cm) to cover the image of a baggage or backpack type package; and it is finally pixelated with pixel sizes smaller than 300 µm to give a satisfactory spatial resolution.

Obtaining the required spatial resolution makes it impossible to use very sensitive Anger type gamma-cameras (with a resolution of more than 3 mm), and instead the detectors used may be:

Radioluminescent-screen-with-memory (Photostimulable phosphor plate or PSP) type detectors, digitised after exposure by a laser scanner ("Computed Radiography"), or remote controllable electronic type ("Digital Radiography") detectors, for example large "plane sensors" either of the "direct" type (X photons are converted into electrical energy in a matrix of detectors—this is the case of selenium matrix detectors) or of the "indirect" type (X photons interact with a scintillator releasing light energy that is then converted into electrical energy in a matrix of photodiodes or in a CCD).

Such detectors are portable and often function on batteries.

Various commercially available radiation detectors are compatible with the invention. The FlasScan 35 OEM Fast detector (marketed by Thales Company) can be used, integrated into an operational system marketed by the VIDISCO Company and called "FlatFox17", for information only and in no way limitatively.

This system has the particular advantage that it can control the detector and the CP120 generator mentioned above; and it has the following characteristics:

the useful area of the detector is 284 mm×406 mm, it has 127 µm square pixels, the detector and the generator can be controlled synchronously by the VIDISCO FlatFox software, and the system is portable and operates using a rechargeable internal battery.

Figure 7:
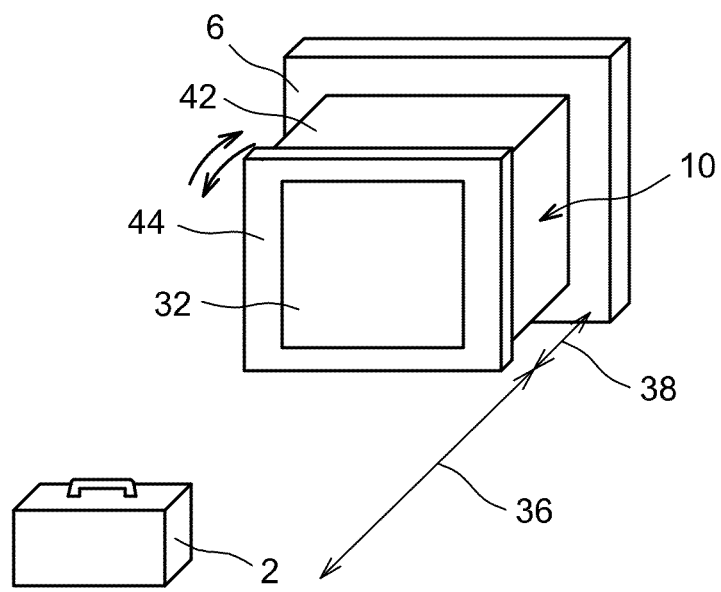
FIG. 7 is a diagrammatic view of an example image formation accessory that can be used in the invention for imaging by backscattering of X radiation, FIGS. 8A and 8B diagrammatically show geometric dimensionings of the image formation accessory.

We will now describe the removable image formation accessory 10 with reference to FIG. 7.

This removable image formation accessory 10 comprises a motor driven mechanical structure 42 that supports a coded mask 32 and puts it into position between the inspected object 2 and the X radiation detector 6 during backscattering imaging or source imaging. This structure 42 also comprises shielding that will protect the detector 6 from parasite radiation.

In FIG. 7, reference 36 represents the distance between the object 2 and the coded mask 32, reference 38 represents the distance between this coded mask and the detector 6, and reference 44 denotes a motor driven rotation system associated with the structure 42.

We will now describe the coded mask 32 and the associated dimensions.

The coded mask 32 is composed of a multiple hole plate for which the characteristics depend on required performances in terms of field of view, spatial resolution, signal-to-noise ratio of the image, with constraints on weight and volume of the final system.

This coded mask 32 is a matrix comprising an arrangement of apertures formed in a material that has a high attenuation coefficient for the radiation type measured, for example a metallic material such as tungsten or equivalent, typically with a thickness of 500 µm.

Note that this thickness and the size of the apertures are of the same order of magnitude to guarantee an aspect ratio (aperture diameter divided by the material thickness) equal to approximately 1 to limit collimation effects that reduce the image quality.

The detector 6 should be placed close to the object 2, due to the low backscattered flux level. The result is so-called "near field" geometric measurement configurations for which the appearance of decoding artifacts is a well known problem. One recommended solution for minimising them is to use the mask/anti-mask technique described in document

[2] "Near Field artifact reduction in planar coded aperture imaging", R. Accorsi and R. C. Lanza, Applied Optics, Vol. 40, No. 26, September 2001 with MURA type patterns, in other words rank n "modified uniformly redundant array" type patterns, where n is a prime number.

More information about MURA patterns can be obtained in the following document:

[3] S. R. Gottesman and E. E. Fenimore, Applied Optics 28, 4344 (1989).

In practice, an anti-symmetric mask by rotation is interesting. This is the preferred solution chosen in the invention. Therefore such a solution requires a preferably motor-driven and electrically independent reversible rotation system moving from one position to another (reference 44 in FIG. 7).

Duplication of the unit pattern of the coded mask in the form of a 2×2 mosaic is recommended to improve the signal-to-noise ratio of the measurement while accepting a small detector size, which is why there is a complete mask comprising (2n−1) rows and (2n−1) columns.

The coded mask 32 is a matrix of square pixels. Some of the pixels (preferably half of them) have circular apertures through them. The use of circular apertures maintains the mechanical strength of the mask that is self-supported.

The choice of design parameters for the image formation accessory 10 is the result of a compromise between required performances and miscellaneous constraints.

Figure 8A:
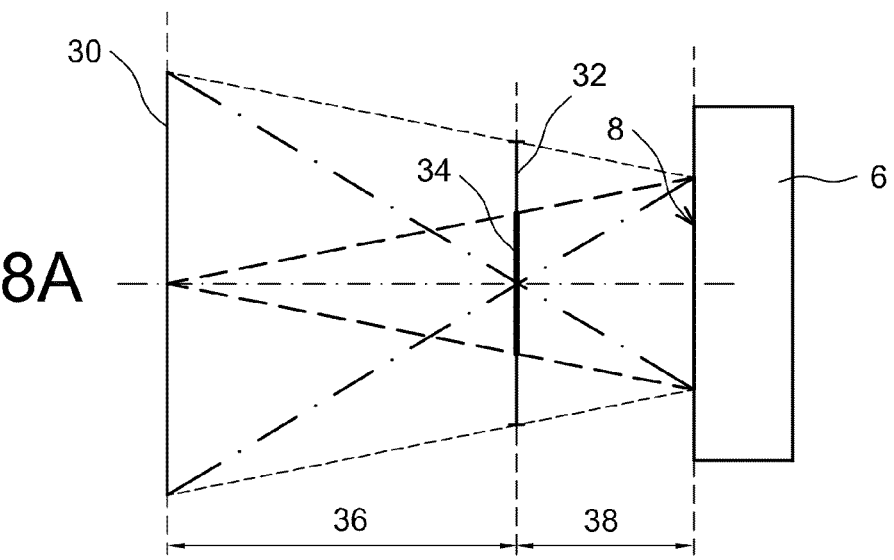
Figure 8B:
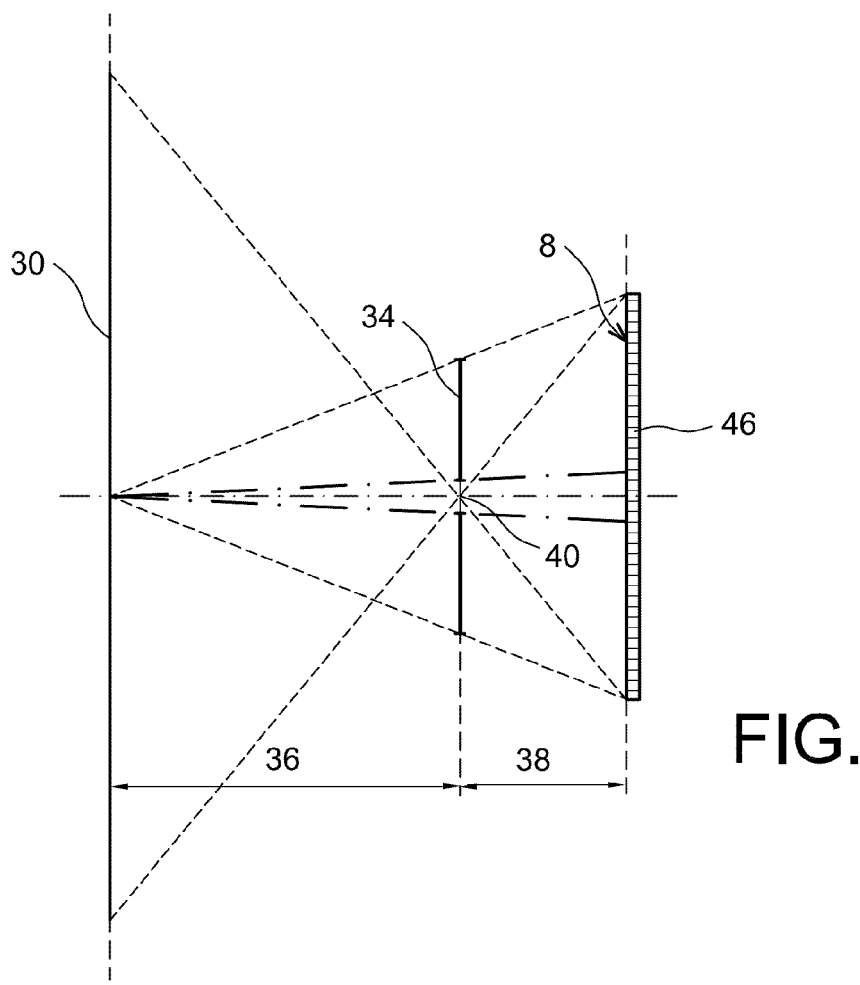

One possible geometric configuration is illustrated by the diagrams in FIGS. 8A and 8B.

Reference 30 in these figures shows a field of view of the examined object, observed from the detector 6 through the coded mask 32. FIG. 8A diagrammatically shows a unit pattern 34 of this mask. One of the perforated pixels 40 of this unit pattern 34 is shown in more detail in FIG. 8B. FIG. 8B also symbolically shows pixels 46 of the detector 6 in the useful detection zone 8 of the detector 6.

To obtain:
a field of view 30 the same size as baggage with a dimension larger than 30 cm,
spatial resolution better than 3 mm,
mask-detector distance 38 between 15 cm and 25 cm to limit the size of the system,
a mask-object distance 36 between 20 cm and 100 cm to adapt the measurement to size and radiation flux constraints, it is necessary to have:
a useful detection zone 8 with side dimension of at least 11 cm composed of 100 μm pixels 46, associated with a unit pattern 34 with a rank n equal to at least 127, the coded mask 32 having 500 μm pixels with 300 μm diameter apertures 40, or
a useful detection zone 8 with side dimension of at least 15 cm composed of 200 μm pixels 46, associated with a unit pattern 34 with a rank n equal to at least 103, the coded mask having 1000 μm pixels with 750 μm diameter apertures 40.

Concerning the unit mask 34, an increase in the rank for a given pixel size has the effect of increasing the field of view 30. The constraint then applies to the resulting size of the unit mask 34 and the useful detection zone 8.

For a given rank, a reduction in the size of the pixels of the coded mask 32 has the effect of improving the spatial resolution but reducing the angular field of view. The constraint then applies to the technological feasibility and the cost of the coded mask and the associated detector.

Consider FIG. 7.

The coded mask 32 is fixed to the detector 6 through the mechanical structure (or mechanical part) 42 that acts firstly as a support, and secondly as shielding protecting the detector from ambient parasite radiation. The atomic number and thickness of the material from which the part 42 is made are such that attenuation of the parasite radiation is sufficient and appropriate for the measurement.

The mechanical part 42 is associated with the motor driven rotation system 44 that is energy independent and remote controlled. It moves the coded mask 32 reversibly from a 0° position to a 90° position. Stops (not shown) equipped with microcontacts (not shown) enable precise and reproducible positioning to prevent decoding artifacts.

A device according to the invention can detect a radioactive source provided that the following parameters are compatible: activity of the radioactive source, emission energy, dimensions of this source, source-coded mask distance and detector sensitivity. Imaging performances (field of view, spatial resolution) are exactly the same as for backscattering imaging, for an identical measurement geometry.

Figure 9:
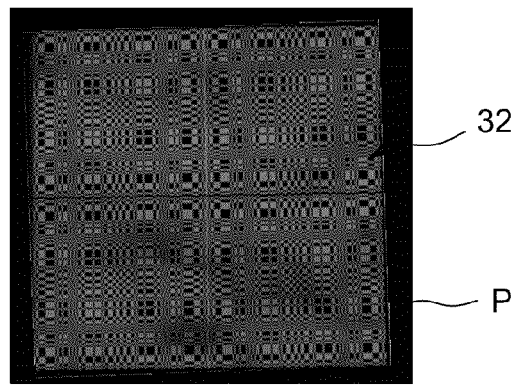
FIG. 9 is a photograph of a 2*2 MURA 107 anti-symmetric coded mask that can be used in the invention for imaging by backscattering of X radiation.

For information only and in no way limitatively, the coded mask 32 shown in FIG. 9 may be used.

This mask comprises a 2×2 mosaic of the rank n=107 anti-symmetric MURA pattern, in which the pixel side dimension is 700 μm. There are 22684 500 μm diameter apertures. These apertures are formed by drilling in a 500 μm thick DENAL® plate using a numerical control machine. The useful area of this plate is 14.9 cm×14.9 cm and its mass is less than 200 g.

The pattern of the coded mask is centred on a slightly larger plate P so that the mask can be attached to its support 42 (FIG. 7), at a fixed distance of 22.8 cm from the detector.

The motor driven rotation system 44 (FIG. 7) is powered and controlled through cables at a distance of up to 50 m.

Possible spatial resolutions vary from 2 mm to 2.7 mm and the field of view from 30 cm to 40 cm, for a mask-object distance varying from 68.5 cm to 100 cm. Projection of the unit pattern (unit coded mask) on the detector uses an area of between 10 cm×10 cm and 12 cm×12 cm.

The shielding of the mechanical structure 42 forming part of the image formation accessory is made of lead and it is 5 mm thick.

We will now again consider the control and acquisition device 14 (FIGS. 1 to 5).

This device 14 can be used for the three imaging types, namely radiography, backscattering imaging and radioactive source imaging.

More precisely, the device 14 is designed to:
synchronously control the assembly formed by the source 4, the detector 6 and the control system of the mask rotation device 44 (FIG. 7), when it is used, and
process raw signals received by the detector 6 during the examination of the baggage 2, in order to form an image of what is contained in it.

The device 14 comprises a control and acquisition computer on which control and analysis software is installed. In particular, image analysis and interpretation tools are capable of changing the display parameters, particularly the contrast, and measuring the dimensions of objects contained in the examined baggage 2.

Moreover, as we have seen, the device 14 is provided with a device 16 capable of displaying the images obtained.

The software associated with the transmission imaging device synchronously controls the X radiation source 4 and the detector 6, and then transfers signals for fast display of the image as soon as acquisition is complete.

In the special case of multi-energy radiography, the software controls the source 4 by modifying its energy in a pre-established mode, and analyses the resulting individual images to render an image that is capable of discriminating organic materials from inorganic materials.

For backscattering imaging and radioactive source imaging, the device 14 contains a software for decoding images obtained by projection through the coded mask, in addition to the above mentioned functions.

This is because, from a mathematical point of view, the matrix I representing the unit coded image, is the result of the convolution product denoted * of the spatial distribution of the object-source O and the coding function M that represents the unit coded mask and is equal to 1 when the pixel contains an aperture and otherwise 0. Therefore, neglecting the background noise, we can write:

$$I(x,y)=O(x,y)*M(x,y)$$

The decoding function N is deduced from the matrix M. It is such that:

$$N(x,y)=-1 \text{ if } M(x,y)=0$$

$$N(x,y)=1 \text{ if } M(x,y)=1$$

This is because the correlation product (denoted ⊗) of M by N gives the Dirac function δ. We obtain:

$$I(x,y) \otimes N(x,y)=O(x,y)*M(x,y) \otimes N(x,y)= O(x,y)*\delta(x,y)=O(x,y).$$

The spatial distribution of the object-source can then be restored by performing the correlation product between the matrix I and the decoding function N. Using the Fourier space, this correlation can be summarised as a multiplication of the Fourier transform of the two matrices.

For information, the conjugate complex of the Fourier transform of N is used to slightly improve the final image quality.

The decoding matrix N must firstly be resized to be the same size as the matrix I and depends on the mask-object distance. The entire decoding process is done very quickly, considering the performances of existing computers.

Furthermore, the software enables quasi-dynamic display of images due to automatic refreshment within a very short time period compatible with operation time constraints and functioning durations of the X generator and the detector.

A summation of several unprocessed "mask" images on the one hand and unprocessed "anti-mask" images on the other hand, before decoding, can improve measurement statistics and therefore the final image quality.

Acquisition can thus be stopped at any time. For example, the display can be refreshed every 3 minutes for 2 minutes of X radiation emission and the detector acquisition (including the two mask and anti-mask images).

The sequence for obtaining and displaying a backscattered image is as follows:
  an unprocessed "mask" image is made with the mask in the 0° position for 1 minute of X radiation emission;
  then the mask is rotated by 90°;
  an unprocessed "anti-mask" image is then made with the mask in the 90° position for the same time;
  the deconvolution software decodes the first and then the second unprocessed image;
  the mask then returns to its initial position at 0°;
  the sum of the two decoded images is calculated to obtain and display the backscattered image without artifacts.

This sequence is repeated and the unprocessed images are successively added to the previous images and then decoded in the same way to obtain, by summation, the updated image that is regularly displayed.

Note that the radioactive source imaging technique uses the same sequence (without using the X radiation generator 4).

Tools for the analysis and interpretation of backscattering images and radioactive source images can be used for the following, in addition to tools used for transmission imaging:
  focusing of the image to improve the sharpness by artificial variation of the mask-object distance 36 (FIG. 7) in the decoding process; this operation makes it possible to estimate the real distance between the mask 32 and the backscattering object 2 when the latter is hidden by a wall;
  localizing of one or several suspicious elements in the package, by superposition of the backscattered image with a photograph of the baggage provided that a camera is placed at the centre of the mask 32 oriented in the direction of said baggage.

We will now describe several results obtained using the invention.

The techniques described with reference to FIGS. 1, 2 and 3 were applied for example but not limitatively to a piece of baggage 2 consisting of an approximately 28 cm×18 cm suitcase. This suitcase contains various objects such as a book, a portable telephone inserted in the book, two printed circuits, electrical wires, a fictitious detonator and a bar of Marseille soap (to simulate explosive).

Figure 10:
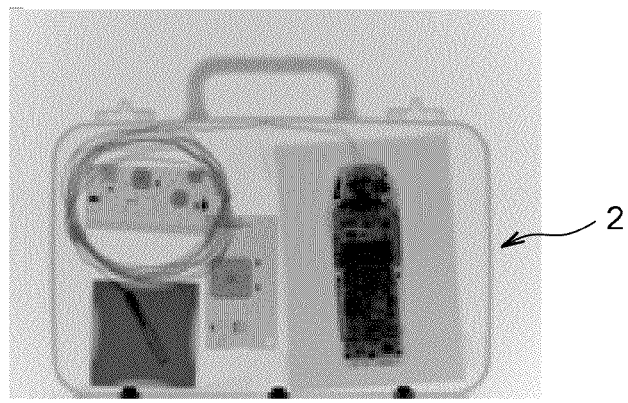
FIG. 10 shows an image obtained experimentally by X radiography of a suitcase using the invention, this suitcase particularly containing a so-called lightweight element (with a low atomic number), in this case a piece of soap, a portable telephone inside a book, a fictitious detonator, cables and printed circuits, FIGS. 11A and 11B respectively show the image obtained experimentally by backscattering X-ray from the suitcase in FIG. 10, and superposition of this image with a photograph of the suitcase as seen from the coded mask.

X radiography was done on the suitcase, shown in FIG. 10.

For this X radiography, the source 4 is placed 2 m from the front of the suitcase and the detector 6 is placed as close as possible to the back of it. The quality of the image obtained is such that objects contained in the suitcase can be distinguished. The control and acquisition device 14 associated with the display device 16 is placed at a distance of 50 m to control the source 4 and the detector 6. The entire radiography device is powered by a battery. The duration of the X radiation emission is less than or equal to 1 minute.

This suitcase was also examined by backscattering imaging.

For backscattering imaging, the source 4 is fitted with the shielding and collimation device 5 and is placed at 50 cm from the suitcase; the coded mask 32 is placed at a distance 36 equal to 66 cm; the distance 38 between the matrix detector 6 and the coded mask 32 is equal to 22.8 cm; and the angle between the emission axis of the source 4 and the imaging axis is equal to 30°.

Figure 11A:
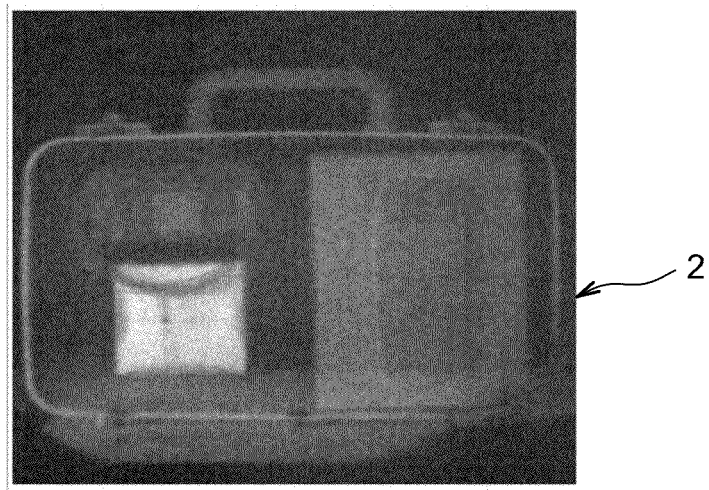

The backscattered image of the suitcase is shown in FIG. 11A. The field of view is a 29 cm square at the mask-object distance of 66 cm. The spatial resolution is equal to 0.15°, which is equal to 2.2 mm at this distance. The total acquisition time is equal to 15 minutes for 10 minutes exposure to X rays, but most of the information is obtained during the first 3-minute acquisition cycle.

Figure 11B:
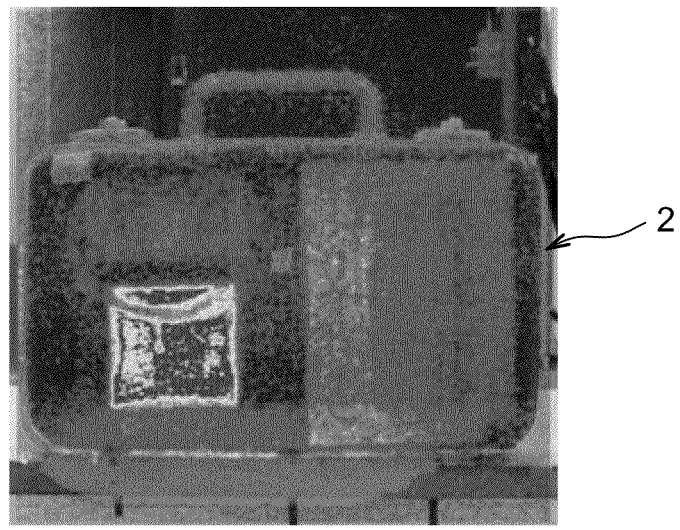

The backscattered image superposed on the photograph of the suitcase seen from the coded mask is also shown in FIG. 11B.

Considering the performances of the device used, backscattered imaging can be done behind a 2 mm thick aluminium wall or an approximately 0.5 mm thick steel wall.

The suitcase was also examined by gamma imaging.

In the example diagrammatically shown in FIG. 3, the same device is used to examine baggage 2 to determine whether or not it contains a radioactive source. In this case, the detector 6 fitted with the image formation accessory 10 is used facing the baggage 2. The source 4 is not used.

Figure 12:
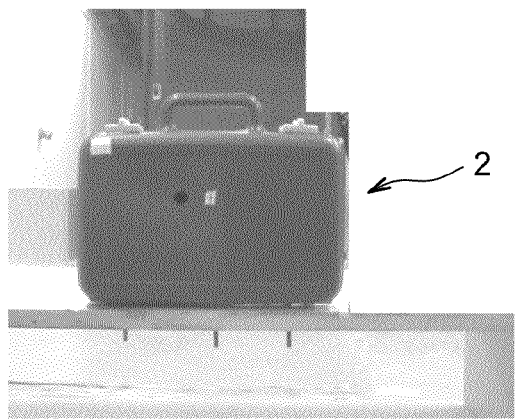
FIG. 12 shows a gamma image artificially superposed on a visible image of the same object (suitcase) containing a radioactive source.

To illustrate this, the image of a point source virtually contained in the same suitcase (FIGS. 10, 11A, 11B) is shown in FIG. 12, by superposing the image of this point source onto the photograph of the suitcase seen from the coded mask.

The examples of the invention given above relate to the examination of an object by X radiation. But the invention is not limited to the use of such radiation: it can also be used with gamma radiation.

More specifically starting from the given examples, those skilled in the art could design a device conforming with the invention comprising a gamma radiation source, a gamma radiation detector, a removable shielding and collimation accessory adapted to gamma radiation, a removable image formation accessory adapted to this radiation, and a control, acquisition and processing system (similar to system 14) that is also adapted to it.

The invention claimed is:

1. Portable and versatile device for non-destructive examination of an object, comprising:
    an X or gamma radiation source, adapted to radiography,
    at least one matrix detector, sensitive to X rays or gamma rays, that is large and finely pixelated, adapted to radiography, this detector having a large useful detection zone in which a square with sides of at least 20 cm will be inscribed, this useful zone being composed of small detection pixels, smaller than 300 gin,
    a shielding and collimation accessory, fitted on the X or gamma radiation source, to adapt it to backscattering imaging, wherein removable ring collimators provide different emission cones,
    at least one removable image formation accessory, based on the coded aperture imaging technique, this image formation accessory including a mechanical structure, preferably motor driven, comprising a large and finely pixelated coded mask on which a square with sides of at least 6 cm can be inscribed, this coded mask comprising small pixels smaller than 1000 gm, the structure being designed to be placed in contact with the detector for backscattering imaging or radioactive source imaging, and
    a system for the synchronised control of the X or gamma radiation source, the detector and the image formation accessory, and for data acquisition and processing in order to display an image in real time, which enables radiography of the object and/or backscattering imaging thereof and/or detection and localization of a radioactive source present in the object.

2. Portable device according to claim 1, in which the source is an X-ray generator with a power of more than 100 W.

3. Portable device according to claim 1, in which the mechanical structure, comprising the coded mask, is equipped with shielding that will protect the detector from parasite radiation.

4. Portable device according to claim 1, in which the coded mask has an anti-symmetric MURA type pattern and the portable device also comprises a rotation device to reversibly rotate the coded mask from 0° to 90°.

5. Portable device according to claim 1, in which the matrix detector, sensitive to X or gamma rays, comprises a pixelated electronic detector or a radioluminescent screen with memory.

6. Method for using the portable device according to claim 1, in which:
    the radiation source and the detector are placed on each side of the object so that it can be examined by X or gamma radiography, or
    the radiation source fitted with the shielding and collimation accessory, and the detector fitted with the image formation accessory, are placed on the same side of the object so that the object can be examined by X or gamma backscattering imaging, or
    the detector, fitted with the image formation accessory, is placed facing the object to examine the object to determine whether or not it contains a radioactive source.

7. Method for using the portable device according to claim 1, in which:
    the portable device comprises two detectors,
    the radiation source fitted with the shielding and collimation accessory, and one of the detectors, are placed on each side of the object so that the object can be examined by X or gamma radiography, and
    the other detector, fitted with the image formation accessory, and the source are placed on the same side of the object so that it can then be examined by X or gamma backscattering imaging.

8. Method for using the portable device according to claim 1, in which:
    the portable device comprises two detectors fitted with their image formation accessories,
    the radiation source, fitted with the shielding and collimation accessory, and the two detectors are placed on the same side of the object to simultaneously examine the object by X or gamma backscattering along two different axes.

* * * * *